US008555374B2

(12) United States Patent
Wu et al.

(10) Patent No.: US 8,555,374 B2
(45) Date of Patent: *Oct. 8, 2013

(54) HIGH PERFORMANCE PACKET PROCESSING USING A GENERAL PURPOSE PROCESSOR

(75) Inventors: Handong Wu, Los Angeles, CA (US); Zbigniew Sufleta, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/167,761

(22) Filed: Jun. 24, 2011

(65) Prior Publication Data

US 2011/0258694 A1 Oct. 20, 2011

Related U.S. Application Data

(63) Continuation of application No. 09/609,690, filed on Jul. 5, 2000, now Pat. No. 7,991,917.

(51) Int. Cl.
*G06F 15/16* (2006.01)

(52) U.S. Cl.
USPC .......... 726/13; 709/236

(58) Field of Classification Search
USPC .......... 709/200–202, 224, 236; 370/349, 370/389, 392, 471
See application file for complete search history.

(56) References Cited

U.S. PATENT DOCUMENTS

| | | | | |
|---|---|---|---|---|
| 5,615,340 | A | 3/1997 | Dai et al. | |
| 5,627,829 | A | 5/1997 | Gleeson | |
| 5,761,729 | A | 6/1998 | Scales | |
| 5,826,014 | A | 10/1998 | Coley et al. | |
| 5,898,830 | A | 4/1999 | Wesinger, Jr. et al. | |
| 5,983,270 | A | 11/1999 | Abraham et al. | |
| 5,987,610 | A | 11/1999 | Franczek et al. | |
| 6,052,788 | A | 4/2000 | Wesinger, Jr. et al. | |
| 6,061,798 | A | 5/2000 | Coley et al. | |
| 6,065,065 | A | 5/2000 | Murakami et al. | |
| 6,069,827 | A | 5/2000 | Sinclair | |
| 6,073,142 | A | 6/2000 | Geiger et al. | |
| 6,167,445 | A | 12/2000 | Gai et al. | |
| 6,253,321 | B1 | 6/2001 | Nikander et al. | |
| 6,262,776 | B1 | 7/2001 | Griffits | |
| 6,393,026 | B1 | 5/2002 | Irwin | |
| 6,460,050 | B1 | 10/2002 | Pace et al. | |
| 6,493,752 | B1 | 12/2002 | Lee et al. | |
| 6,647,418 | B1 | 11/2003 | Maria et al. | |
| 6,675,218 | B1 | 1/2004 | Mahler et al. | |
| 6,850,521 | B1 | 2/2005 | Kadambi et al. | |
| 7,506,155 | B1 | 3/2009 | Stewart et al. | |
| 7,991,917 | B1 * | 8/2011 | Wu et al. | 709/250 |
| 2003/0123448 | A1 * | 7/2003 | Chang | 370/395.1 |

* cited by examiner

*Primary Examiner* — Moustafa M Meky
(74) *Attorney, Agent, or Firm* — Patent Capital Group

(57) ABSTRACT

A packet processing device includes a control logic processor for filtering packets according to a set of stored rules and an arithmetic logic processor for executing packet processing instructions based on the content of the packet. The control logic processor spawns a new thread for each incoming packet, relieving the arithmetic logic processor of the need to do so. The control logic processor and the arithmetic logic processor preferably are integrated via a thread queue. The control logic processor preferably assigns a policy to each incoming packet. A policy action table stores one or more policy instructions which may be easily changed to update policies to be implemented. The policy action table preferably maps a virtual packet flow identification code to the physical memory address of an action code and a state block associated to the identification code. The arithmetic logic processor processes a packet based on the stored policy assigned to that packet.

20 Claims, 2 Drawing Sheets

HIGH PERFORMANCE PACKET PROCESSING USING A GENERAL PURPOSE PROCESSOR

RELATED APPLICATION

This application is a continuation (and claims the benefit of priority under 35 U.S.C. §120) of U.S. application Ser. No. 09/609,690, filed Jul. 5, 2000, now U.S. Pat. No, 7,991,917 entitled "HIGH PERFORMANCE PACKET PROCESSING USING A GENERAL PURPOSE PROCESSOR," Inventor(s) Handong Wu, et al. The disclosure of the prior application is considered part of (and is incorporated by reference in) the disclosure of this application.

BACKGROUND OF THE INVENTION

The field of the invention is computer network security, and more specifically a system for rapidly identifying and processing incoming packets from a computer network.

Many computer network security tools require a high performance packet-processing capability to identify, classify and act upon on incoming data packets according to predefined rules. Over the years, increasing network carrying capacity and speed, and increasing use of the Internet, have resulted in a large increase in the number of data packets routed into systems connected to data networks. Further, the average degree of complexity of actions that are performed on those data packets has increased, due to the increased number of security threats that may be carried over a computer network. For example, distributed denial of service (DDOS) attacks flood one or more computers with a vast number of packets, such that the target computer cannot effectively process other data, blocking access to those one or more computers by individuals or entities wishing to connect legitimately to that target computer. The recent spread of such DDOS attacks on well-known companies through the World Wide Web shut down many e-commerce web sites and network business activities, and highlighted the potential security threats posed by network connections.

Existing packet-processing systems typically deal with packet complexity and volume in an ad hoc way, and rely on one or more complicated application specific integrated circuits (ASICs) or field programmable gate arrays (FPGAs) dedicated to packet processing, thereby providing a fast but inflexible solution. A general processor may be integrated with the dedicated packet processing ASICs or FPGAs in an attempt to provide flexibility to the system. However, such integration generally provides poor results, degrading the overall performance of the packet processing system. Further, existing packet processing systems typically use a time-expensive hashing mechanism to assign rules to packets and process them, further degrading packet processing performance.

Thus, there is a need for a system and method for providing efficient integration of processors for data packet processing. Further, there is a need for a system and method for providing more efficient complex processing of data packets routed into computer systems. Further, there is a need for a system and method for organizing complex processing of data packets.

SUMMARY OF THE INVENTION

The present invention satisfies the shortcomings of data packet processing systems in the prior art. The system of the present invention comprises a general-purpose high-performance packet processor. A policy action table is implemented to support the flexibility of packet processing operations and fast network policy changes.

In an aspect of a preferred embodiment, a packet processing device includes a control logic processor for filtering packets according to a set of stored rules and an arithmetic logic processor for executing packet processing instructions based on the content of the packet. In a further aspect of a preferred embodiment, the control logic processor spawns a new thread for each incoming packet, relieving the arithmetic logic processor of the need to do so. In a further aspect of a preferred embodiment, the control logic processor assigns a policy to each incoming packet.

In another aspect of a preferred embodiment, a policy action table stores one or more policy instructions. In a further aspect of a preferred embodiment, the policy action table provides a high degree of flexibility by allowing policy changes through an update of the entries in the policy action table. In a further aspect of a preferred embodiment, the policy action table maps a virtual packet flow identification code to the physical memory address of an action code and a state block associated to the identification code. In a further aspect of a preferred embodiment, the policy action table is implemented with a general-purpose processor to deliver a high degree of flexibility and performance.

In another aspect of a preferred embodiment, the arithmetic logic processor processes a packet based on the stored policy assigned to that packet.

DETAILED DESCRIPTION OF THE PREFERRED EMBODIMENTS

Figure 1:
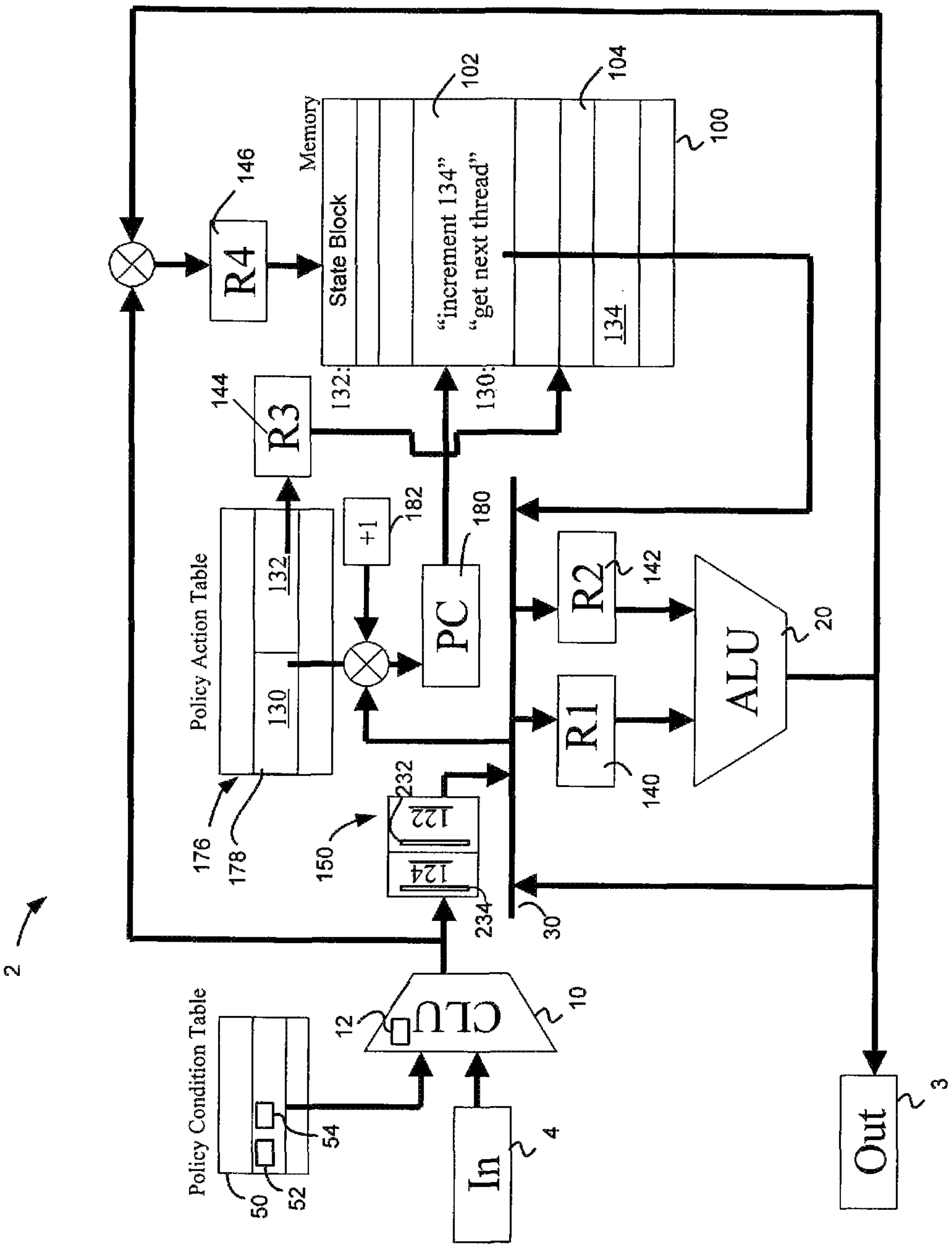
FIG. 1 is a block diagram illustrating a system architecture for present invention.

Referring to FIG. 1, a preferred embodiment of a packet processor 2 is shown. There are two main functional units: an arithmetic logic unit (ALU) 20 and a control logic unit (CLU) 10. The ALU 20 is the processor core and the CLU 10 is the filtering unit. In a preferred embodiment, the CLU 10 analyzes packets accepted by a register-in 4 and determines whether to accept or discard those packets. Such analysis is preferably performed by logic 12 within the CLU 10, as shown schematically in FIG. 1. In a preferred embodiment, the CLU 10 is implemented on an application-specific integrated circuit (ASIC) or field-programmable gate array (FPGA), both of which are well known to those skilled in the art. The CLU 10 assigns a thread to each accepted packet, which is appended to or otherwise associated with those accepted packets. Preferably, the ALU 20 processes the accepted packets based on a policy to which those packets are assigned, and transmits such processed packets to a register-out 3. Such processed packets then proceed to their destination. The ALU 20 is preferably a general-purpose microprocessor, and may be a complex instruction set computer processor, or a reduced instruction set computer processor. The packet processing queue 150, which holds threads associated with packets admitted by the CLU 10 for later processing by the ALU 20, is preferably implemented in a computer memory such as a random-access memory (RAM) chip, which is commonly available and well known to those skilled in the art. However, other forms of memory may be used, such as but not limited to flash memory. The policy action table 176 maps the threads associated with the packets that are stored in the packet processing queue 150 to the physical memory address of the instructions and state associated with each packet. In a preferred embodiment, the policy action table 176 is implemented in an ASIC, allowing fast access between the policy action table 176 and the thread data it acts upon, and allowing the instructions in the policy action table 176 to be easily revised. The policy action table 176 may be implemented in structures other than an ASIC, if desired. The memory unit 100 preferably takes the form of random-access memory (RAM) chips, which are commonly available and well known to those skilled in the art. However, other forms of memory may be used, such as but not limited to flash memory. The memory unit 100 preferably stores packet processing instructions and state data The memory unit 100 may be implemented in the same physical memory device as the packet processing queue 150, or in a physically separate memory device. The packet processing queue 150 may also be implemented in a processor cache associated with the ALU 20. The use of a processor cache is well known to those skilled in the art. A data bus 30 connects the memory unit to the CLU 10 and the ALU 20. Preferably, the data bus 30 operates at a speed fast enough to allow packet processing to occur rapidly enough such that incoming packets do not overflow the packet processing queue 150. Several registers and counters are also shown in FIG. 1, the functions of which are described in greater detail below. The physical implementation of registers and counters is well known to those skilled in the art.

Figure 2:
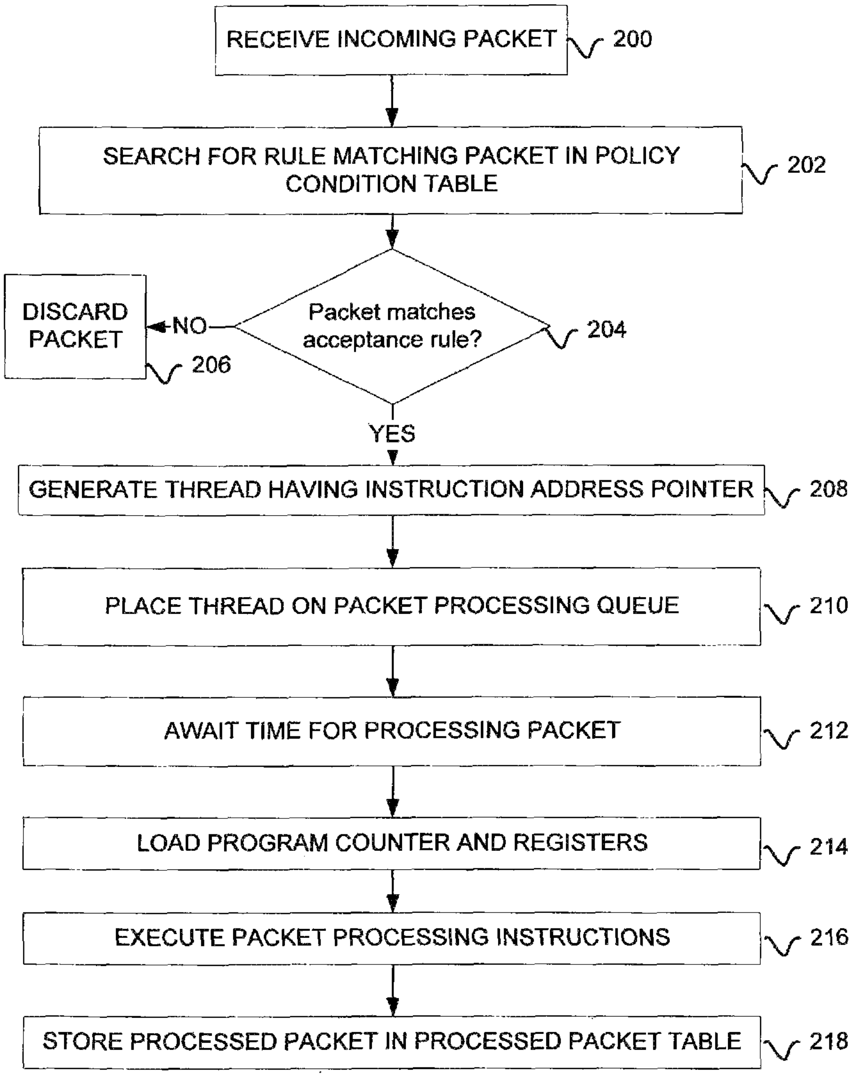
FIG. 2 is a flow diagram illustrating a method performed by the system of FIG. 1.

Referring as well to FIG. 2, a preferred embodiment of a method for packet processing is shown. In step 200, an incoming packet is received into the register-in 4. The incoming packet is preferably received from a communications network such as the Internet, but may instead be received from a local area network or other type of network, or from another machine in another fashion, such as but not limited to wireless transmission. The assembly and transmission of data packets is well known to those of ordinary skill in the art The incoming packet is held temporarily in the register-in 4 until it is processed by the CLU 10. It is expected that a number of packets will be received by the register-in 4 and held there for processing. In a preferred embodiment, the register-in 4 is sized to accommodate the maximum expected packet traffic, to minimize the risk that packets transmitted to the packet processor 2 will be inadvertently lost.

Next, in step 202, a packet stored in the register-in 4 is transmitted to the CLU 10. Preferably, the register-in 4 transmits packets to the CLU 10 on a first-in, first-out (FIFO) basis, because the characteristics of the packets stored in the register-in 4 that would be used to determine priority have yet to be determined. A policy condition table 50 is associated with the CLU 10. The policy condition table 50 contains one or more predefined rules for admitting incoming packets from the register-in 4. A first rule 52 and a second rule 54 are shown schematically within the policy condition table 50 as examples; in a preferred embodiment, many more rules may be stored within the policy condition table 50. The rules within the policy condition table may correspond to packet formats or packet contents. The CLU 10 reads the packet header information and/or the packet contents, and searches for a matching rule in the policy condition table 50.

Next, in step 204, three possible outcomes of that search are possible. First, if the incoming packet does not match any rule stored in the policy condition table 50, the process moves to step 206, in which the packet is discarded. By discarding nonstandard packets of unexpected types, the CLU 12 improves security. Such nonstandard packets are likely to be hostile in intent and effect, and preventing them from entering a computer or network and being processed enhances network security. Second, if the incoming packet matches a rule instructing the CLU 10 to discard the incoming packet, the process proceeds to step 206, where the incoming packet is discarded. A rule instructing the CLU 10 to discard a particular type of packet is particularly useful when particular repeating packets are known to be hostile. For example, in a typical DDOS attack a vast number of identical packets are transmitted to the target computer to consume most or all of the target computer's processing time and/or other system resources. A rule instructing the CLU 10 to discard such packets allows a computer or network connected to the packet processor 2 to function substantially normally, because those hostile packets are not allowed into the computer or network to consume valuable processing time. Finally, if the incoming packet matches a rule instructing the CLU 10 to forward the packet for processing, the process advances to step 208.

In step 208, the CLU 10 places the filtered incoming packet 122 into the packet processing queue 150, and generates a thread 232 corresponding to the packet 122. A thread is a logic identifier 122 or other pointer associated with a record 178 stored in the policy action table 176. The logic identifier 232 is appended to or otherwise associated with the packet 122 for which it was generated. For example, if the incoming packet matches the first rule 52 in the policy condition table 50, the CLU 10 generates a thread 232 which points to a record 178 stored in the policy action table 176 for processing a packet in accordance with the first rule 52, and appends that thread to the packet 122. That is, the thread 232 is matched to a record 178 in the policy action table 176 that corresponds to the rule to which the incoming packet 122 was matched by the CLU 10.

The policy action table 176 contains one or more policies for packet processing, corresponding to the rules contained within the policy condition table 50. The policy condition table 50 assigns a rule to a packet; the policy action table 176 acts on the corresponding policy 178 and directs the processing of the packet according to that policy. Network policy is not limited to concerns such as security, and may include policies such as resource usage priority and bandwidth management. The policy action table 176 provides a high degree of policy flexibility. For example, to change a policy regarding a certain type of packet, preferably a single change to the policy action table 176 will suffice. Packets corresponding to that new policy are then processed according to its instructions.

Also in step 208, state data derived from the packet header or packet contents preferably is loaded into the fourth register 146, which buffers such state data before writing it to the memory unit 100. Preferably, this state data is used to generate one or more state blocks stored in the memory unit 100. The use of one or more state blocks in packet processing is described in greater detail below.

In step 210, the packet 122 and its associated thread 232 preferably are placed in the packet processing queue 150, which is a temporary storage location for packets to be processed. Next, in step 212, that packet and its associated thread wait in the packet processing queue 150 for processing by the ALU 20. The packet processing queue 150 may be ordered as a FIFO queue, a priority queue, or other form of queue. In a FIFO queue, packets entering the packet processing queue 150 are processed in the order in which they enter the packet processing queue 150. In a priority queue, packets entering the packet processing queue 150 are processed in an order based on one or more of their characteristics. For example, packets addressed to a certain machine on a network, or having certain content, may be processed before other packets entering the packet processing queue 150. Preferably, steps 210 and 212 are omitted from the process if no other packets are in the packet processing queue 150 and the ALU 20 is available for packet processing. However, step 210 may still be utilized, by placing packets in the packet processing queue 150 and taking them up immediately for processing. No artificial waiting period need be imposed on a packet in the packet processing queue 150.

In step 214, when the ALU 20 is available for processing the next packet awaiting processing in the packet processing queue 150, the program counter register 180, the first register 140, the second register 142, and the third register 144 are loaded. The logic identifier 232 of that packet 122 is loaded into the program counter register 180. The value of the logic identifier 232 is in turn matched with the corresponding record 178 in the policy action table 176, such that the address pointer 130 associated with a particular packet is read from the record 178 to indicate that the first instruction for processing the thread is stored at the location 130 in the memory unit 100. Preferably, if additional locations in the memory unit 100 are required for storing processing instructions, the first location 130 includes an address for proceeding to another location in the memory unit 100 for further instructions. A particular policy 178 to be executed on a packet contains an instruction address pointer 130 that points to a location 102 in the memory unit 100 where the instructions corresponding to the policy 178 are stored, and a state address pointer 132 that points to a location 104 in the memory unit 100 where a state block is stored. In a preferred embodiment, the state block includes one or more data items corresponding to the context (that is, the state of the machine or the state of the network) with which the packet processor 2 is used. Preferably, the instructions 102 for processing a packet take into account one or more elements of the state of the machine or the state of the network that will utilize that packet. In a preferred embodiment, multiple state blocks are present within the memory unit 100, each containing specific elements of the machine or network state for use by the associated instruction 102 in packed processing. However, a single state block may be provided for use by each of the instructions 102 in the memory unit 100. The state block or blocks are preferably dynamically updated to reflect the current state of the machine or network. By adjusting packet processing based on machine state, some network policies may be better implemented, such as but not limited to policies regarding bandwidth management and congestion control. The state block is preferably updated based on state data received from incoming packet headers via the fourth register 146. The determination of a network state and updating the state of a network connection are well known to those in the art.

The first register 140, the second register 142 and the third register 144 are loaded according to the policy action table 176. When the policy 178 is to be executed, the instructions 102 for executing that policy are loaded from the memory unit 100 into the first register 140, and the packet itself is loaded from the packet processing queue 150 into the second register 142. The address pointer element 132 is loaded into the third register 144 to specify a base address 104 of the associated state block in the memory unit 100, such that the instructions 102 may utilize the state block into account in processing the thread if the instructions 102 so require. However, the registers may be used in other ways if desired.

In step 216, the instructions 102 are executed. The ALU 20 reads the instructions 102 stored in the first register 140, and uses them to operate upon the packet stored in the second register 142. The instructions 102 located at the instruction pointer location 130 for the thread 232 preferably are loaded and executed by the ALU 20 in sequence. If the ALU 20 comprises more than one processor, the instructions may be loaded and executed in series or in parallel.

The ALU 20, as a part of its core processing duties, provides a slice of time for processing threads waiting in the packet processing queue 150. When processing a thread, the ALU 20 locates a record 178 in the policy action table 176 corresponding to the logic identifier 232. The logic identifier 232 has a value according to the rule that the packet matched with record 178. The record 178 contains a first memory address pointer 130 indicating the beginning of a code segment or set of executable instructions 102 for executing on the thread, and a second memory address pointer 132 indicating the location of the state block associated with that set of instructions 102. The ALU 20 thus may process multiple threads according to respective sets of instructions located in the memory unit 100.

After each instruction from instruction set 102 is loaded, the program counter 180 is updated by the program counter increment unit 182 as long as a get next thread or end of instruction set indicator is not encountered by the ALU 20. The get next thread and end of instruction set indicators are preferably placed in the instruction set 102 to inform the ALU 20 when the instruction set 102 for a packet has been completely executed, so that the ALU 20 can proceed to the next packet and expeditiously continue processing packets waiting in the packet processing queue 150.

Finally, in step 218 the processed packet is transmitted to the register-out 3, or a table or other data storage entity, for use or further processing. The register-out 3 is preferably a standard register or buffer, capable of storing enough processed packets that the risk of loss of a processed packet is minimized.

The packet processor 2 is capable of processing a number of different incoming packets. These incoming packets are either discarded or admitted, as described above. Each admitted packet is assigned a thread by the CLU 10 and placed in the packet processing queue 150, also as disclosed above. As an example, when a second packet 124 is admitted by the CLU 10, it is assigned a thread 234. The second thread 234 corresponds to a specific policy within the policy action table 176. The second thread 234 need not point to a different policy than the first thread 232; indeed, if the first packet 122 and the second packet 124 both have been classified according to the same rule in step 202, both the first thread 232 and the second thread 234 will point to the same policy 178. However, if the first packet 122 and the second packet 124 are classified differently in step 202, then the first thread 232 preferably points to a different policy in the policy action table 176 than the second thread 234. If the packet processing queue 150 is a FIFO queue, the first packet 122 is processed by the ALU 20 before the second packet 124, which awaits its turn in the packet processing queue 150. If the packet processing queue 150 is a priority queue, the second packet 124 may be processed ahead of the first packet 122 based on their relative priority. The processing of the second packet 124, as well as subsequent packets admitted by the packet processor 2, proceeds as disclosed above with regard to the first packet 122.

More than one CLU 10 and/or ALU 20 may be utilized if desired. The use of multiple processors may enhance the speed with which the packet processor 2 filters and processes incoming packets. If more than one CLU 10 is used, the size of the packet processing queue 150 may be adjusted to handle the increased rate of packet intake. Further, if multiple CLUs 10 or ALUs 20 are used, then the size of the memory unit 100 also may be adjusted accordingly, as may the capacity and the number of registers.

While the preferred embodiment has been described in terms of the creation and utilization of a number of threads corresponding to different packets, it is within the scope of the preferred embodiment to associate different packets to different tokens or flows instead of threads, and process those tokens or flows instead of threads. The use and processing of tokens and data flows are well known to those skilled in the art.

A preferred apparatus and method for high performance packet processing and many of their attendant advantages has thus been disclosed. It will be apparent, however, that various changes may be made in the form, construction and arrangement of the parts or in the steps or order of steps of the method, without departing from the spirit and scope of the invention, the form hereinbefore described being merely a preferred or exemplary embodiment thereof. Therefore, the invention is not to be restricted or limited except in accordance with the following claims and their legal equivalents.

What is claimed is:

1. An apparatus, comprising:
- a first processor configured for filtering activities that include:
  - discarding a first packet determined to be a nonstandard packet;
  - discarding a second packet determined to be a repeating packet in comparison to previously received packets; and
- a second processor configured for processing a plurality of packets according to one of a plurality of instructions, wherein the apparatus is configured for:
  - creating a thread for each of the plurality of packets; and
  - evaluating header information and contents of the plurality of packets, wherein state data is derived from a particular packet header corresponding to a particular packet included in the plurality of packets.

2. The apparatus of claim 1, further comprising:
- a policy condition table coupled to the first processor and having a plurality of rules stored therein.

3. The apparatus of claim 1, further comprising:
- a policy action table coupled to a memory unit and configured for storing a data processing policy.

4. The apparatus of claim 3, wherein the data processing policy comprises:
- a first address pointer element for identifying a first location in the memory unit for one of the instructions; and
- a second address pointer element for identifying a second location in the memory unit of a state block.

5. The apparatus of claim 3, wherein each of the threads corresponds to at least one policy stored in the policy action table.

6. The apparatus of claim 1, wherein the first processor interacts with logic for matching a first incoming packet to a stored first rule and for generating a first thread if the first incoming packet matches the first rule.

7. The apparatus of claim 1, wherein the first processor is configured for determining whether to accept or discard each of the plurality of packets.

8. The apparatus of claim 1, further comprising:
- an addressable memory unit in which the instructions for packet processing are stored; and
- a data bus connecting the addressable memory unit and the first and second processors.

9. The apparatus of claim 8, wherein a data processing policy comprises a first address pointer to a starting address of a first set of instructions and a second address pointer to a starting address of a state block stored in the addressable memory unit, and wherein the state block can be used by a first set of instructions for processing a first incoming packet.

10. The apparatus of claim 1, wherein a policy action table is provisioned in order to map particular threads associated with the plurality of packets, being stored in a packet processing queue, to a physical memory address of the instructions and the state data associated with each of the plurality of packets.

11. The apparatus of claim 1, further comprising:
- a second memory unit connected to the first processor and the second processor, the second memory unit being configured to temporarily store particular packets before processing by the second processor.

12. The apparatus of claim 1, wherein at least some of the plurality of packets are identified as being associated with a denial of service (DOS) such that they are discarded.

13. The apparatus of claim 1, wherein the state data for the plurality of packets is used to generate one or more state blocks to be stored in a memory unit.

14. A method, comprising:
- processing a plurality of packets according to one of a plurality of instructions;
- filtering the plurality of packets, wherein the filtering includes, at least:
  - discarding a first packet determined to be a nonstandard packet;
  - discarding a second packet determined to be a repeating packet in comparison to previously received packets;
- creating a thread for each of the plurality of packets; and
- evaluating header information and contents of the plurality of packets, wherein state data is derived from a particular packet header corresponding to a particular packet included in the plurality of packets.

15. The method of claim 14, further comprising:
- identifying a first location in a memory unit for one of the instructions; and
- identifying a second location in the memory unit of a state block.

16. The method of claim 14, further comprising:
- matching a first incoming packet to a stored first rule and for generating a first thread if the first incoming packet matches the first rule.

17. The method of claim 14, further comprising:
- determining whether to accept or discard each of the plurality of packets, wherein at least some of the plurality of packets are identified as being associated with a denial of service (DOS) such that they are discarded.

18. The method of claim 14, further comprising:
- mapping particular threads associated with the plurality of packets, being stored in a packet processing queue, to a physical memory address of the instructions and the state data associated with each of the plurality of packets.

19. The method of claim 14, wherein the state data for the plurality of packets is used to generate one or more state blocks to be stored in a memory unit.

20. One or more non-transitory media that includes code for execution and when executed by a processor operable to perform operations comprising:
- processing a plurality of packets according to one of a plurality of instructions;
- filtering the plurality of packets, wherein the filtering includes, at least:
  - discarding a first packet determined to be a nonstandard packet;

discarding a second packet determined to be a repeating packet in comparison to previously received packets;

creating a thread for each of the plurality of packets;

evaluating header information and contents of the plurality of packets, wherein state data is derived from a particular packet header corresponding to a particular packet included in the plurality of packets;

matching a first incoming packet to a stored first rule and for generating a first thread if the first incoming packet matches the first rule; and determining whether to accept or discard each of the plurality of packets, wherein at least some of the plurality of packets are identified as being associated with a denial of service (DOS) such that they are discarded.

* * * * *